July 23, 1957 M. J. UDY 2,800,396
PHOSPHORUS RECOVERY
Filed March 10, 1953
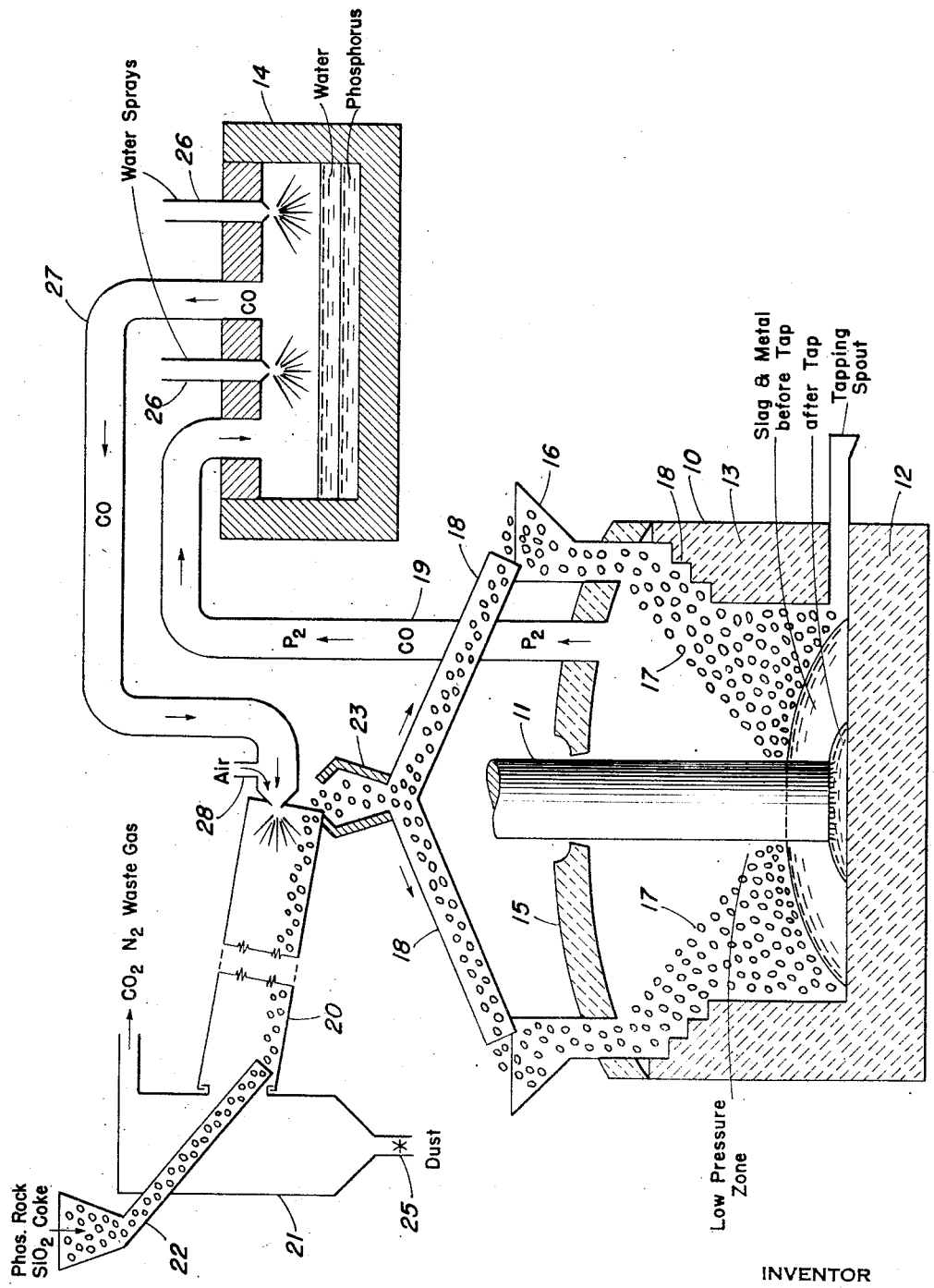
INVENTOR
Marvin J. Udy
BY
Donald F. McCarthy
ATTORNEY

United States Patent Office 2,800,396
Patented July 23, 1957

2,800,396

PHOSPHORUS RECOVERY

Marvin J. Udy, Niagara Falls, N. Y., assignor to Strategic-Udy Metallurgical & Chemical Processes Limited, Hamilton, Ontario, Canada Application March 10, 1953, Serial No. 341,414

6 Claims. (Cl. 23—223)

This invention relates to the recovery of phosphorus and has for an object the provision of an improved process for recovering phosphorus from phosphate rock and other phosphorus-bearing ores.

The invention is based, in part, on my discovery that by preheating a charge comprising phosphorus-bearing material and utilizing effectively the sensible heat of the preheated charge by feeding the charge directly into the hot zone of a molten slag bath maintained at a high temperature in an electric furnace, it is possible to facilitate reduction of the phosphorus to the elemental state and effect a substantial saving in time, with consequent increase in plant capacity, and a substantial saving in electric power required for reduction. The invention is based, in part, also, on my discovery that the reduction and recovery of phosphorus of phosphorus-bearing ore contained in a smelting charge can be facilitated by placing the charge, with or without preheating, on the surface of a molten slag bath maintained at a temperature sufficiently high, by means of combined electric arc and resistance heating to provide substantially all of the heat required for promoting and effecting reduction and vaporization of the phosphorus. The invention contemplates the provision of an improved process involving the use of heat developed in molten slag by means of combined electric arc and resistance for promoting and effecting reduction of the phosphorus of phosphorus-bearing material by means of carbonaceous material. The invention also contemplates the provision of an improved process for recovering phosphorus from phosphorus-bearing material in an electric furnace operation, involving controlled feeding of the charge to the furnace to maintain a low-pressure zone in the area of reduction. The invention further contemplates the provision of a flexible and efficient process which will permit the use of heat produced by combustion of relatively inexpensive fuel in conjunction with heat produced through use of more costly electric power.

The reduction and distillation of phosphorus requires temperatures which can be obtained readily only through the use of electric power. Power costs are so high in some localities that the production of phosphorus from phosphorus ores there available through the use of electric power is not economically feasible. In such localities, however, combustible fuel may be relatively inexpensive, and the provision of a process permitting conjoint use of electric heat and combustion heat is desirable, particularly in view of present world shortages of fertilizers.

According to heretofore customary practices, phosphorus is produced by smelting a deep charge comprising phosphorus-bearing material in a submerged arc electric furnace, and it is difficult or virtually impossible to utilize efficiently heat absorbed by the charge in a preliminary heating operation, or preheating operation so-called. In such a furnace operation, the charge is heated by means of hot gases passing upwardly therethrough from the smelting zone, a deep charge being employed to filter the gases or solid ore particles. Heat thus absorbed by a cold charge from hot gases generated in the smelting zone is utilized in the reducing reactions, but if the charge were preheated or heated preliminarily to its introduction into the furnace, the heat of the gases generated in the smelting zone could not be absorbed. Consequently, any beneficial effect of preheating would be nullified by the resulting waste of heat of the gases generated in the smelting zone.

The heat absorbed by the charge in the preheating treatment would not be utilized effectively. Preheating of a charge under the circumstances could not be utilized to facilitate reduction, as compared with the ease of reduction in the utilization of the heat of the gases generated in the smelting zone, and, actually, there would result a loss, rather than a saving, of power through wasting of the heat of those gases.

In order to utilize effectively in a reduction operation heat absorbed by a phosphorus-bearing charge in a preheating operation, I modify the heretofore customary type of reducing operation by employing a reducing furnace in which there is maintained at a high temperature a molten bath comprising slag and unreduced phosphorus-bearing material.

In accordance with a preferred process of the invention, a charge comprising phosphorus-bearing material, fluxing material and solid carbonaceous material is preheated by subjecting it to a sintering treatment in an operation employing combustion heat with the production of a hot sintered product which is charged, while hot, into a reducing furnace comprising a molten bath.

The charge preferably is prepared for sintering and subsequent reduction by finely dividing and intimately mixing the components as, for example, by grinding them together in a suitable mill. The intimately mixed charge may comprise particles of any suitable sizes. A mixture in which a large proportion or substantially all of the particles are small enough to pass a 4-mesh screen may be employed advantageously. The mixture may contain all of the carbonaceous reducing agent required to effect complete reduction of the phosphorus of the charge or only a portion of the required reducing agent may be incorporated in the mixture, and the balance may be added separately to the molten bath in the reducing furnace.

Any grade of coal or other carbonaceous reducing agent may be employed advantageously in the preheating or sintering operation, but, in the reducing operation, I prefer to employ coke. The use of a preheating or sintering operation permits the use of low-grade relatively inexpensive coal for accomplishing both preheating or sintering and reduction. The coal is mixed with the phosphorus ore and silica, and the mixture is heated with access of air to effect combustion of a portion of the coal to provide heat required for sintering. In the sintering operation, the volatile matter of the coal is driven off and burned and a residue of solid carbon free of volatile matter is produced. By adjusting the amounts and proportions of coal and other materials in the sintering charge, an amount of solid carbonaceous residue sufficient to effect complete reduction of the phosphorus in the subsequent reducing operation may be produced.

The invention utilizes heat contained in molten slag as the source of heat for promoting the reduction to the elemental state of phosphorus contained in phosphorus-bearing material. In a process of the invention, a charge comprising (1) phosphorus-bearing material such as calcium phosphate, (2) siliceous fluxing material for combining with calcium oxide contained in the calcium phosphate-bearing material in chemically combined form and liberated when the phosphorus is reduced and (3) solid carbonaceous material is placed on the surface of a molten slag bath maintained at a temperature sufficiently high to provided substantially all of the heat required for melting the fluxing material of the charge and calcium oxide liberated as a result of the reduction of phosphorus with the production of molten slag and for promoting and effecting reduction of the phosphorus of the calcium phosphate-bearing material of the charge by means of the carbonaceous reducing material of the charge with the production and vaporization of elemental phosphorus.

The invention permits the advantageous use of finely divided calcium phosphate-bearing material. In practicing the invention, finely divided calcium phosphate-bearing material may be mixed with finely divided siliceous fluxing material and finely divided solid carbonaceous material to form a finely divided charge in which the components are intimately mixed. Intimate mixing of the components of the charge in finely divided forms promotes reduction of the phosphorus of the calcium phosphate and facilitates the production of elemental phosphorus and the recovery of the phosphorus in suitable form when the charge comprising the intimately mixed components is placed on the surface of the molten slag bath.

I prefer to employ electric arc and resistance heating (arc-resistance heating) for maintaining the slag bath at a temperature high enough to provide the heat required for promoting and effecting reduction of the phosphorus of the calcium phosphate-bearing material by means of the carbonaceous reducing material and for melting slag formed by reaction of released calcium oxide with the fluxing material of the charge and by reaction of the siliceous fluxing material with mineral gangue materials associated with the phosphate ore or the coal or coke employed. Combined electric arc and resistance heating as employed in accordance with my invention involves the utilization of heat developed by one or more arcs extending between the arcing tips of the electrodes and the upper surface of a molten slag bath plus heat developed as the result of the resistance of the slag of the slag bath to the flow of electric current therethrough in passing or flowing between the electrodes.

When employing finely divided calcium phosphate-bearing material in forming a charge for reduction, I prefer to employ coal as the solid carbonaceous component of the charge, preferably, coal having coking or fusing properties, if available, and to heat the charge mixture to a temperature above the fusing or coking temperature of the coal prior to placing the charge on the surface of the molten slag bath. By employing coal and particularly coal having coking or fusing properties, I obtain several advantages. Thus, in using coal of any type as the solid carbonaceous reducing material, I effect a substantial reduction in the cost of the reducing material as compared with the cost of the coke commonly employed in phosphorus reduction and recovery processes. In employing coal having fusing or coking properties and heating a charge mixture to a temperature above the fusing or coking temperature of the coal, I effect a more stable and, thus, a more effective intimate mixing of the components of the charge, for the coal upon fusing or coking functions as bonding material for the other components of the charge, and the tendency for the particles to separate or segregate, which characterizes loose mixtures of finely divided materials, is substantially completely avoided or eliminated. In practicing the invention when employing coal having fusing or coking properties, I prefer to carry out the heat treatment for the purpose of effecting fusing or coking by passing the charge mixture through a rotary kiln or other suitable apparatus provided with suitable heating means wherein the tumbling of the charge will maintain the components of the charge in the desired intimately mixed state while they still are in the finely divided condition so that when fusing or coking takes place the components will become fixed in the desired intimate association, and a substantially homogeneous charge will be formed. Heating of the charge serves to effect vaporization of the volatile matter of the coal with the resulting two-fold advantage of providing volatile combustible material which can be and preferably is burned to provide a portion of the heat required for the heat treatment and avoiding the introduction into the electric furnace of the volatile matter of the coal with the attendant disadvantages resulting from gasification of the volatile matter within the electric furnace. Tumbling of the charge during the heat treatment for coking purposes insures the production of granular free-flowing material which can be subjected to the subsequent reducing treatment more advantageously than can lumpy material. Granular material promotes ease of handling and charging and, also, facilitates reduction. Generally, fusing or coking to a suitable extent or degree can be effected at a temperature as low as about 500° C. to 600° C.

In employing combined electric arc and resistance heating (arc-resistance heating) for maintaining the molten slag bath at the desired temperature, I prefer to employ a covered electric arc furnace provided with one or more vertically extending electrodes. In operating such a furnace during the course of a process of the invention, I maintain the arcing tips of the one or more electrodes in sufficiently close proximity to the upper surface of the molten slag bath to inhibit dissipation of the arc-developed heat by reflection and to insure delivery to the molten slag bath of substantially all of the arc-developed heat, and I introduce charge material into the furnace and onto the surface of the molten slag bath therein at a rate such as to maintain a low-pressure zone adjacent the arcing tips of the one or more electrodes.

The establishment of low-pressure zones results in avoidance of the possibility of periodic blowing of the charge out of the furnace with the consequent danger to operators and disturbance of the operation that takes place, particularly when charges comprising relatively small particles are employed, because of unpredictable and uncontrollable rates of reaction and high pressure created by establishing deep beds of charge material around the electrodes in accordance with heretofore customary practices.

Introduction of charge into the interior of the electric furnace is carried out at a rate such that it is deposited on the surface of the molten bath between the furnace walls and the electrodes without flowing into contact with the electrodes, or at a rate such that it flows into contact with the electrodes and builds up around the electrodes to a depth of only a few inches.

In carrying out a process in accordance with the invention, all of the carbonaceous material to be employed for reduction of the phosphorus of the calcium phosphate in the electric furnace may be introduced into the furnace in admixture with the other components of the reducing charge, or a portion may be introduced into the furnace in admixture with the other components of the total charge and a portion may be introduced into the arc electric furnace separately.

Dissipation of the arc-developed heat by reflection may be inhibited satisfactorily by maintaining arcs not greater in length than about one-half inch. A zone of suitably low pressure adjacent to the one or more electrodes may be maintained by limiting the depth of charge material immediately adjacent to the one or more electrodes to a maximum of twelve (12) to fifteen (15) inches. A layer of charge adjacent the electrodes having a depth of about six (6) to twelve (12) inches will provide satisfactorily for absorption of the sensible heat of the gases generated.

In operating the electric furnace employing combined electric arc and resistance (arc-resistance) heating in accordance with the invention, the tips of the one or more electrodes preferably are maintained in positions with respect to the vertical ranging between about one-half inch (½") above the surface of the slag bath and two inches (2") below the surface of the slag bath. Immersion or penetration of the one or more electrodes in or into the molten slag bath to a depth short of that which will permit wetting of the electrodes by the slag will thus permit retention of the arc-resistance heating character of the operation with utilization constantly of arc-developed heat plus heat developed by the resistance of the slag of the slag bath to the flow of electric current therethrough between the electrodes. Tapping of the furnace is controlled to maintain in the furnace a slag bath having a depth not less than about three inches (3″) in order always to maintain between the arcing tips of the electrodes and metal beneath the slag bath a layer of slag at least one inch (1″) in depth.

Maintenance constantly within a furnace of a molten slag bath of proper depth with a layer of molten slag disposed between the arcing tips of the electrodes and molten metal beneath the slag bath permits the use of substantially constant voltages at substantially constant power factor and provides for smooth furnace operations.

Through operation of the furnace constantly as an arc-resistance furnace with short arcs and constant or substantially fixed resistance through control of the depth of the molten slag bath and the positions of the electrodes, I am able to operate substantially constantly at power factor of about 95% or higher.

In the operation of the arc electric furnace in accordance with the preferred procedure of the invention, automatic electrode regulators are set to maintain and do maintain the electrodes in constant or substantially fixed positions relatively to the surface of the molten slag bath, because, for a particular type of operation, the slag is of substantially constant composition and, therefore, of substantially constant resistance. When an increase or decrease in the temperature of the molten slag bath is desired for a particular operation, the voltage is increased or decreased and the electrode regulator is adjusted to maintain the arc length within the desired range (equivalent to the arc length established by maintaining the arcing tips of the electrodes in a position relatively to the vertical between about one-half (½″) inch above the surface of the slag bath and two inches (2″) below the surface of the slag bath). In following this procedure, the resistance is maintained constant and, consequently, the power input is increased or decreased.

Preliminary heating of a charge to effect granulation in accordance with the invention may be carried out at temperatures between about 500° C. and the temperature of reduction of phosphorus contained in the phosphate ore. Preferably, heating is carried out at a temperature in the upper portion of the range extending from 500° C. to the temperature of reduction of the phosphorus. A suitable temperature for promoting the production of a suitable granular product is one just at or just below the fusing temperature of the slag—a temperature, preferably, at which sufficient softening of the charge undergoing treatment to produce a sintered or fritted, free-flowing granular product takes place. Adjustment of the proportions of slag-forming materials present in the charge may be carried out advantageously to provide for effective granulation or sintering at temperatures of incipient fusion in the range of about 1200° C. to 1300° C.

I may incorporate in the charge to be subjected to a preliminary sintering treatment for the production of a granular product all or any desired portion of the total amount of solid carbonaceous material required for reduction of the phosphorus. When an amount of solid carbonaceous material less than the amount required to effect complete reduction is employed, additional solid carbonaceous reducing material may be added to the charge employed in the subsequent reducing operation.

In forming a charge in accordance with the invention, I prefer to mix intimately the various components including the ore, solid carbonaceous material, and fluxing material. The components may be crushed to any suitable degrees of fineness and any suitable mixing methods and apparatus may be employed. For most effective mixing, I prefer to grind together in a suitable mill the various components of the charge. A charge in which all of the materials are finely divided and a large proportion of the particles are small enough to pass a 4-mesh screen permits effective sintering and reduction with the production of a granular product. Charges comprising small particles permit more intimate contact of components and provide for more rapid sintering and reduction. When a non-coking coal is employed, or when coke is employed, and the preliminary heating treatment is so conducted that the carbonaceous material will not be bonded together with the fluxing materials and ore of the charge, I prefer to employ the coal or coke in the form of finely divided but relatively coarse particles to insure sufficient weight or mass to permit wetting by the slag. Particles of sizes resulting from crushing with crusher jaw settings of about one inch (1″) are satisfactory.

Any suitable type of furnace may be employed for carrying out the sintering treatment. I prefer to employ a rotary kiln of the type of a cement kiln or a traveling hearth type sintering furnace, such, for example as the Dwight-Lloyd sintering furnace or a tunnel kiln.

The invention will be better understood from a consideration of the following description in conjunction with the accompanying drawings in which the single figure is an elevation, partly schematic and partly in section, of apparatus suitable for use in carrying out a process of the invention.

The apparatus shown in the drawings comprises a covered arc electric furnace 10 provided with three substantially identical electrodes 11 (two electrodes not shown) supported by means of conventional holders (not shown) and electrically connected in circuit with conventional control and power supplying means (not shown), including transformer secondaries, voltage regulating means and automatic electrode positioning or adjusting means.

The arc electric furnace 10 is rectangular in horizontal cross-section and comprises a hearth or bottom portion 12, side walls 13, and walls (not shown) and a roof 15, all formed of appropriate refractory materials. An electric furnace of any suitable horizontal cross-sectional configuration may be employed.

The roof 15 is provided with suitable openings through which the electrodes 11 extend and which permit vertical movement of the electrodes in accordance with operational demands and characteristics. The spaces between the electrodes and the edges of the openings through which the electrodes extend or project may be provided with any suitable conventional packing or sealing means to inhibit or restrict or prevent the flow of gases between the interior and the exterior of the furnace without interfering with the necessary vertical movements of the electrodes.

Hoppers 16 having their lower portions extending through and sealed in openings in the roof 15 are provided adjacent the outer side edges and the end edges of the electric furnace in alinement with the electrodes to permit the introduction of charge materials 17 into the interior of the furnace.

The portions 18 of the side and end walls of the furnace immediately beneath the hoppers 16 preferably are so designed as to provide a slope corresponding to or equivalent to the angle of repose of the charge material. Preferably, the sloped portions of the walls are stepped or terraced, as shown in the drawings, to provide for the deposition and retention thereon of protective coatings of charge material.

A conduit 19 communicates with the interior of the electric furnace 10 through an opening in the roof 15 and with the interior of a condenser 14 to permit the separation and separate collection of elemental phosphorus and carbon monoxide produced in the process.

The apparatus shown in the drawings includes an inclined rotary kiln 20 communicating with a stationary dust collecting chamber 21 and provided with a hopper and chute or conduit arrangement 22 for introducing charge material thereinto at or about its point of highest elevation. At the opposite end of the rotary kiln, means are provided for introducing a combustible mixture of air and carbon monoxide produced in the electric furnace to permit utilization of the carbon monoxide for pre-heating charge material to be introduced into the electric furnace. The dust collecting chamber 21 is provided with a rotary sealing device 25 which permits withdrawal of collected dust particles without permitting ingress of air or other gas from the exterior.

A storage or receiving hopper or chamber 23 is provided for receiving the heated charge material from the rotary kiln and delivering it under the influence of gravity through conduits 18 to the furnace hoppers 16 from where it is introduced into the electric furnace at a temperature not substantially lower than the temperature attained in the rotary kiln.

As indicated in the drawings and as described above, the rotary kiln 20 preferably is operated at an elevated temperature in the range 1200° C. to 1300° C. to effect agglomeration of a finely divided mixture of phosphate-bearing material, fluxing material such as lime (CaO) and coal with the production of a free-flowing granular product, heat being provided through combustion of the carbon monoxide produced in the arc electric furnace 10 and the volatile matter of the coal distilled from the coal in the kiln.

The conduit 19, communicating with the interior of the furnace 10, communicates, also, with the interior of the condenser 14 which is provided with a tapping spout (not shown), water sprays 26 and a gas outlet conduit 27. The gas outlet conduit 27 communicates with the interior of the rotary kiln 20 at its lowermost or discharge end. An air inlet 28 is provided adjacent the point at which the conduit 27 communicates with the interior of the rotary kiln to permit the introduction into the conduit 27 of sufficient air to provide for oxidation of carbon monoxide, separated from the phosphorus in the condenser 14, with the production of heat energy.

Provision may be made for by-passing the kiln and conducting the carbon monoxide directly to one or more other points of utilization. When air and the hot gases containing carbon monoxide are excluded from the interior of the kiln, the kiln functions primarily as a mixing device for producing an intimately mixed charge of finely divided phosphorus-bearing material, fluxing material and carbonaceous material which may be delivered to the arc electric furnace at substantially atmospheric temperature without granulation or agglomeration. At relatively low temperatures produced by the use of controlled relatively high rates of passage of charge materials through the kiln and controlled rates of heat development, the kiln functions primarily as a nodulizing or granulating device in which coal having a relatively low fusing or coking temperature acts as the bonding agent. At relatively high temperatures corresponding to sintering temperatures or temperatures of incipient fusion produced by the use of controlled relatively low rates of passage of charge materials through the kiln and controlled rates of heat development, the kiln functions as a nodulizing or granulating device in which the softened non-carbonaceous materials or minerals of the charge function as the bonding agent or agents.

Apparatus of the type illustrated in the drawings may be utilized for the treatment of charges of any suitable types comprising phosphate-bearing material, carbonaceous reducing material and siliceous fluxing material. In utilizing apparatus of the type illustrated, a charge of suitable composition is introduced into the rotary kiln 20 through the hopper and chute arrangement 22. The charge preferably comprises or consists largely of solid particles small enough to pass a 4-mesh screen, and they preferably are intimately mixed together prior to the introduction of the charge into the rotary kiln. As hereinbefore pointed out, the rotary kiln may be employed to effect intimate mixing of the particles of the charge. The kiln may be operated with or without utilization of heat to effect heating of the charge. When preliminary heating of the charge prior to its introduction into the arc electric furnace is not desired, the components of the charge may be mixed in any suitable apparatus other than the kiln and the mixed charge may be introduced directly into the storage hopper 23 and conveyed from there to the furnace charging hoppers 16 by means of the conduits 18, or, the mixed charge may be introduced directly from the mixing apparatus into the furnace charging hoppers 16.

When heating of the charge is desired in order to effect the production of a granular free-flowing product in which particles of the components are bonded together and held in intimate contact, heat may be provided by the introduction into the kiln and ignition therein of a combustible mixture of atmospheric air and carbon monoxide produced in the arc electric furnace 10 through the conduit arrangement 19 and 27. When combustible volatile matter of coal is to be oxidized in the kiln to provide additional heat, air is supplied in the amount required for oxidation of such volatile combustible matter in addition to the amount required for oxidation of the carbon monoxide. If additional heat should be required or desired, it may be supplied from any suitable source in any suitable manner. Usually, combustion of the carbon monoxide and the combustible matter of high-volatile matter coal, coupled with control of the rate of passage of the charge through the kiln, will provide all heat required for heating the charge to the highest desirable temperatures, such as sintering temperatures or temperatures of incipient fusion of the non-carbonaceous mineral particles in the range of about 1200° C. to 1300° C.

Charge material discharged from the rotary kiln 20 into the storage hopper 23 is conducted by means of the conduits 18 to the charging hoppers 16 from where it flows under the influence of gravity into the arc electric furnace and onto the surface of the molten slag bath therein. The single figure of the drawings shows two positions of the upper surface of the molten slag bath and two depths of molten slag and metal, described by legends, as slag and metal before tap and after tap. The electrodes are shown in one position only, the position they occupy after tapping when the volume of molten material in the furnace is relatively small. As indicated, the arcing tips of the electrodes are disposed at substantially the same level as the upper surface of the molten slag after tapping with short arcs shown as extending beneath the upper surface of the molten slag bath which condition exists because of electrical pressure created and maintained as long as the positions of the arcing tips are not sufficiently below the upper surface of the slag bath to permit wetting of the electrodes by the molten slag. The electrodes have been shown in position with respect to the upper surface of the molten slag bath after tapping only in order to avoid confusion and promote clarity. It will be understood that operating positions of the arcing tips of the electrodes before tapping will be the same or substantially the same with respect to the upper surface of the molten slag bath as shown with respect to the upper surface of the slag bath after tapping.

In the operation of the arc electric furnace 10, reduction of phosphorus of calcium phosphate of the charge material 17 placed on the surface of the molten slag bath is effected substantially entirely by heat contained in the molten slag bath and delivered thereto by means of arc-developed heat and resistance developed heat resulting from resistance to the flow therethrough of electric current passing between electrodes.

In a preferred process of the invention, a charge comprising phosphate rock, $Ca_3(PO_4)_2$, silica and coal or coke is employed, and a preheating operation is carried out at a sintering temperature in the range 1200° C. to 1300° C to produce a hot sintered product. The hot sintered product is introduced, while hot and without substantial dissipation of absorbed heat, preferably at a temperature not lower than about 1000° C., into an open arc electric furnace, covered and provided with means for collecting phosphorus vapor, of the type illustrated in the drawings and described herein, wherein it is heated to a temperature up to about 1550° C. to effect reduction of phosphorus and vaporization of elemental phosphorus.

The following example illustrates a method or process of the invention:

A charge comprising finely divided and intimately mixed particles of phosphate rock (containing 66 percent of calcium phosphate, $Ca_3(PO_4)_2$, silica and coke and containing:

2000 pounds of phosphate rock,
700 pounds of silica, and
400 pounds of coke was heated to a temperature of about 1200° C. in the rotary kiln 20 employing heat produced by the combustion of coal and carbon monoxide produced in a subsequent smelting step to produce a hot sintered product. The hot sintered product was delivered directly into the storage hopper 23 from where it was delivered directly into the covered open arc electric furnace 10 and heated on the surface of a molten slag bath therein to effect a reaction between the carbon of the coke and the calcium phosphate of the phosphate rock to decompose the calcium phosphate with the production of elemental phosphorus which was vaporized and calcium oxide which combined with silica present in the charge to form a calcium silicate slag. The vaporized phosphorus was collected and condensed in the condenser 14 in the liquid molten state under a protective layer of water. Molten slag produced in and withdrawn from the electric furnace 10 contained phosphorus in an amount equivalent 0.50 percent by weight, a content similar to that of slags produced in heretofore customary phosphate smelting operations. The recovery of phosphorus was of the order of ninety-five percent (95%).

A substantial advantage of the method or process of the invention is that it reduces substantially or virtually eliminates dusting nuisances and losses. In the heretofore customary operation employing the submerged arc type electric furnace, dust present or formed in the charge is swept out of the furnace and into the phosphorus collecting equipment by means of gases generated in the reducing zone and passing upwardly through and in contact with the column of charge materials. In a furnace heated by means of combined electric arc and resistance heating employed in practicing the present invention, the charge is placed in a relatively thin layer on a molten slag bath, and no sweeping effect of gases passing through a charge column is established.

The usual deep charge used in the ordinary phosphorus smelting operations operates to place the gases evolved at the smelting zone under high pressure whereas according to the process of my invention the relatively low or thin charge reduces the pressure to a very low value resulting in better filtration and very little dust loss. A further advantage of the invention resides in the fact that by permitting substitution of carbonaceous fuel there is realized a reduction in the electric power required per ton of phosphorus produced.

I claim:

1. In a process for recovering the phosphorus from calcium phosphate, the improvement which comprises forming a finely divided intimately mixed charge comprising the calcium phosphate, silica and solid carbonaceous material, heating the charge to a temperature of incipient fusion by means of combustion heat to produce a high-temperature, granular, substantially free-flowing product containing solid carbon and the silica and calcium phosphate of the original charge, placing the granular product without substantial dissipation of the heat absorbed during the heating treatment on the surface of a molten slag bath in a covered arc electric furnace provided with an outlet for gases and provided with one or more vertically extending electrodes, maintaining the slag bath at a temperature sufficiently high by means of combined electric arc and resistance heating to provide substantially all of the heat required for promoting and effecting reduction of the phosphorus of calcium phosphate of the granular product by means of carbon contained therein with the production of calcium oxide and the production and vaporization of elemental phosphorus and for melting calcium silicate formed by reaction of silica contained in the granular product with calcium oxide formed as a result of the phosphorus reduction, and collecting the vaporized phosphorus, operation of the furnace during the course of the process being controlled to maintain the arcing tips of the one or more electrodes in sufficiently close proximity to the upper surface of the molten slag bath to provide for the maintenance of arcs not greater in length than about one-half inch thus to inhibit dissipation of arc-developed heat by reflection and to insure delivery to the molten slag bath of substantially all of the arc-developed heat and the rate of introduction of charge material into the furnace and onto the surface of the molten slag bath therein being controlled to maintain a low-pressure zone adjacent the arcing tips of the one or more electrodes by limiting the depth of charge material immediately adjacent the electrodes to a maximum of twelve (12) inches.

2. In a process for recovering phosphorus from calcium phosphate, the improvement which comprises forming a finely divided intimately mixed charge comprising the calcium phosphate, silica and solid carbonaceous material, heating the charge to a temperature of incipient fusion by means of combustion heat to produce a high-temperature, granular, substantially free-flowing product containing solid carbon and the silica and calcium phosphate of the original charge, placing the granular product without substantial dissipation of the heat absorbed during the heating treatment on the surface of a molten slag bath in a covered arc electric furnace provided with an outlet for gases and provided with one or more vertically extending electrodes, maintaining the slag bath at a temperature sufficiently high by means of combined electric arc and resistance heating to provide substantially all of the heat required for promoting and effecting reduction of the phosphorus of calcium phosphate of the granular product by means of carbon contained therein with the production of calcium oxide and the production and vaporization of elemental phosphorus and for melting calcium silicate formed by reaction of silica contained in the granular product with calcium oxide formed as a result of the phosphorus reduction, and collecting the vaporized phosphorus, operation of the furnace during the course of the process being controlled to maintain the arcing tips of the one or more electrodes in positions with respect to the vertical between about one-half inch (½") above the upper surface of the molten slag bath and about two inches (2") below the upper surface of the molten slag bath and to maintain immediately beneath the arcing tips of the electrodes a layer of slag at least one inch in depth, thereby to inhibit dissipation of arc-developed heat by reflection to insure delivery to the molten slag bath of substantially all of the arc-developed heat and to maintain the arc-resistance heating character of the operation, the rate of introduction of charge material into the furnace and onto the upper surface of the molten slag bath therein being controlled to maintain a low-pressure zone adjacent the electrodes by limiting the depth of charge material immediately adjacent the electrodes to a maximum of twelve inches (12").

3. In a process for recovering phosphorus from calcium phosphate, the improvement which comprises forming a finely divided intimately mixed charge comprising the calcium phosphate, silica and solid carbonaceous material, heating the charge to a temperature of incipient fusion by means of combustion heat to produce a high-temperature, granular, substantially free-flowing product containing solid carbon and the silica and calcium phosphate of the original charge, placing the granular product without substantial dissipation of the heat absorbed during the heating treatment on the surface of a molten slag bath in a covered arc electric furnace provided with an outlet for gases and provided with one or more vertically extending electrodes, maintaining the slag bath at a temperature sufficiently high by means of combined electric arc and resistance heating to provide substantially all of the heat required for promoting and effecting reduction of the phosphorus of calcium phosphate of the granular product by means of carbon contained therein with the production of calcium oxide and the production and vaporization of elemental phosphorus and for melting calcium silicate formed by reaction of silica contained in the granular product with calcium oxide formed as a result of the phosphorus reduction, and collecting the vaporized phosphorus, operation of the furnace during the course of the process being controlled to maintain the arcing tips of the one or more electrodes in positions with respect to the vertical between about one-half (½") inch above the upper surface of the molten slag bath and about two (2") inches below the upper surface of the molten slag bath to inhibit dissipation of arc-developed heat by reflection and to insure delivery to the molten slag bath of substantially all of the arc-developed heat and the rate of introduction of charge material into the furnace and onto the surface of the molten slag bath therein being controlled to maintain a layer of charge having a depth of about six (6") inches to fifteen (15") inches immediately adjacent the electrodes thereby to maintain a low-pressure zone adjacent the arcing tips of the electrodes while providing for the absorption by charge material of sensible heat of the gases produced within the furnace during the course of the operation.

4. In a process for recovering the phosphorus from calcium phosphate, the improvement which comprises forming a finely divided intimately mixed charge comprising the calcium phosphate, silica and solid carbonaceous material, heating the charge to a temperature of incipient fusion, in the range of about 1200° C. to about 1300° C., by means of combustion heat to produce a high-temperature, granular, substantially free-flowing product containing solid carbon and the silica and calcium phosphate of the original charge, placing the granular product without substantial dissipation of the heat absorbed during the heating treatment on the surface of a molten slag bath in a covered arc electric furnace provided with an outlet for gases and provided with one or more vertically extending electrodes, maintaining the slag bath at a temperature sufficiently high by means of combined electric arc and resistance heating to provide substantially all of the heat required for promoting and effecting reduction of the phosphorus of calcium phosphate of the granular product by means of carbon contained therein with the production of calcium oxide and the production and vaporization of elemental phosphorus and for melting calcium silicate formed by reaction of silica contained in the granular product with calcium oxide formed as a result of the phosphorus reduction, and collecting the vaporized phosphorus, operation of the furnace during the course of the process being controlled to maintain the arcing tips of the one or more electrodes in sufficiently close proximity to the upper surface of the molten slag bath to provide for the maintenance of arcs not greater in length than about one-half inch thus to inhibit dissipation of arc-developed heat by reflection and to insure delivery to the molten slag bath of substantially all of the arc-developed heat and the rate of introduction of charge material into the furnace and onto the surface of the molten slag bath therein being controlled to maintain a low-pressure zone adjacent the arcing tips of the one or more electrodes by limiting the depth of charge material immediately adjacent the electrodes to a maximum of twelve (12) inches.

5. In a process for recovering phosphorus from calcium phosphate, the improvement which comprises forming a finely divided intimately mixed charge comprising the calcium phosphate, silica and solid carbonaceous material, heating the charge to a temperature of incipient fusion, in the range of about 1200° C. to about 1300° C., by means of combustion heat to produce a high-temperature, granular, substantially free-flowing product containing solid carbon and the silica and calcium phosphate of the original charge, placing the granular product without substantial dissipation of the heat absorbed during the heating treatment on the surface of a molten slag bath in a covered arc electric furnace provided with an outlet for gases and provided with one or more vertically extending electrodes, maintaining the slag bath at a temperature sufficiently high by means of combined electric arc and resistance heating to provide substantially all of the heat required for promoting and effecting reduction of the phosphorus of calcium phosphate of the granular product by means of carbon contained therein with the production of calcium oxide and the production and vaporization of elemental phosphorus and for melting calcium silicate formed by reaction of silica contained in the granular product with calcium oxide formed as a result of the phosphorus reduction, and collecting the vaporized phosphorus, operation of the furnace during the course of the process being controlled to maintain the arcing tips of the one or more electrodes in sufficiently close proximity to the upper surface of the molten slag bath to provide for the maintenance of arcs not greater in length than about one-half inch thus to inhibit dissipation of arc-developed heat by reflection and to insure delivery to the molten slag bath of substantially all of the arc-developed heat and the rate of introduction of charge material into the furnace and onto the surface of the molten slag bath therein being controlled to maintain a layer of charge having a depth of about six (6) inches to fifteen (15) inches immediately adjacent the electrodes thereby to maintain a low-pressure zone adjacent the arcing tips of the electrodes while providing for the absorption by charge material of sensible heat of the gases produced within the furnace during the course of the operation.

6. The method of recovering phophorus from calcium phosphate-bearing material which comprises placing a charge comprising calcium phosphate-bearing material, silica and solid carbonaceous reducing material on the surface of a molten slag bath in a covered arc electric furnace provided with an outlet for gases and provided with one or more vertically extending electrodes, maintaining the slag bath at a temperature sufficiently high by means of combined electric arc and resistance heating to provide substantially all of the heat required for promoting and effecting reduction of the phosphorus of calcium phosphate of the charge by means of carbon contained therein with the production of calcium oxide and the production and vaporization of elemental phosphorus and for melting calcium silicate formed by reaction of silica contained in the charge with calcium oxide formed as a result of the phosphorus reduction, and collecting the vaporized phosphorus, operation of the furnace during the course of the process being controlled to maintain the arcing tips of the one or more electrodes in positions with respect to the vertical between about one-half (½") inch above the upper surface of the molten slag bath and about two (2") inches below the upper surface of the molten slag bath to inhibit dissipation of arc-developed heat by reflection and to insure delivery to the molten slag bath of substantially all of the arc-developed heat and the rate of introduction of charge material into the furnace and onto the surface of the molten slag bath therein being controlled to maintain a layer of charge having a depth of about six (6") inches to fifteen (15") inches immediately adjacent the electrodes thereby to maintain a low-pressure zone adjacent the arcing tips of the electrodes while providing for the absorption by charge material of sensible heat of the gases produced within the furnace during the course of the operation.

References Cited in the file of this patent

UNITED STATES PATENTS

| | | |
|---|---|---|
| 1,047,864 | Washburn | Dec. 17, 1912 |
| 1,100,639 | Washburn | June 16, 1914 |
| 1,359,211 | Washburn | Nov. 16, 1920 |
| 1,807,790 | Liljenroth | June 2, 1931 |
| 1,867,239 | Waggaman | July 12, 1932 |
| 2,050,796 | Kerschbaum | Aug. 11, 1936 |
| 2,072,981 | Curtis | Mar. 9, 1937 |
| 2,143,001 | Curtis | Jan. 10, 1939 |
| 2,168,312 | Baily | Aug. 8, 1939 |
| 2,280,101 | Slayter et al. | Apr. 21, 1942 |

OTHER REFERENCES

Zergiebel et al.: "Phosphorus Furnace Reactions," The Electrochemical Society, 1942, Preprint 81-30 (pages 439-444).